United States Patent
Rude

(10) Patent No.: US 6,470,532 B2
(45) Date of Patent: Oct. 29, 2002

(54) CAM HINGE WITH CONTROLLED FRICTION FOR IMPROVED CAM OPERATION

(75) Inventor: Edward T. Rude, Columbia, MD (US)

(73) Assignee: TorqMaster, Inc., Stamford, CT (US)

( * ) Notice: Subject to any disclaimer, the term of this patent is extended or adjusted under 35 U.S.C. 154(b) by 0 days.

(21) Appl. No.: 09/741,602

(22) Filed: Dec. 19, 2000

(65) Prior Publication Data

US 2002/0073508 A1 Jun. 20, 2002

Related U.S. Application Data

(60) Provisional application No. 60/185,605, filed on Feb. 29, 2000.

(51) Int. Cl.⁷ .............................. E05D 11/10; E05F 1/02
(52) U.S. Cl. .............................. 16/335; 16/342; 16/313; 16/338
(58) Field of Search ..................... 16/335, 342, 341, 16/337, 312, 313, 317, 338

(56) References Cited

U.S. PATENT DOCUMENTS

| | | | |
|---|---|---|---|
| 494,549 A | | 4/1893 | Clement |
| 588,642 A | * | 8/1897 | Hoffman ..................... 16/335 |
| 1,166,551 A | | 1/1916 | Simmons |
| 2,458,707 A | | 1/1949 | Jacobs |
| 2,872,697 A | * | 2/1959 | Hizsa, Jr. ..................... 16/342 |
| 3,000,049 A | | 9/1961 | Terry, Jr. |
| 3,203,031 A | * | 8/1965 | Youngdale .................. 16/321 |
| 3,600,743 A | | 8/1971 | Meadows |
| 3,608,130 A | * | 9/1971 | Rudnick ..................... 16/335 |
| 4,617,699 A | | 10/1986 | Nakamura |
| 4,734,955 A | | 4/1988 | Connor |
| 4,785,500 A | | 11/1988 | Langridge |
| 4,845,809 A | * | 7/1989 | Pillifant, Jr. ................. 16/341 |
| 4,962,567 A | * | 10/1990 | Dixon ......................... 16/319 |
| 5,052,078 A | | 10/1991 | Hosoi |
| 5,109,573 A | * | 5/1992 | Sherman ..................... 16/341 |
| 5,406,678 A | * | 4/1995 | Kaden et al. ................. 16/342 |
| 5,632,066 A | * | 5/1997 | Huong ........................ 16/338 |
| 5,943,738 A | * | 8/1999 | Karfiol ........................ 16/342 |
| 6,230,365 B1 | * | 5/2001 | Lu ............................... 16/16 |

FOREIGN PATENT DOCUMENTS

SU  1559080  8/1988

* cited by examiner

Primary Examiner—Chuck Y. Mah
(74) Attorney, Agent, or Firm—Gottlieb, Rackman & Reisman, P.C.

(57) ABSTRACT

A hinge for notebook computers is disclosed which includes a cam mechanism to keep the lid closed when the computer is not in use and a cooperatively operating friction mechanism to maintain the lid's position when in use. The friction mechanism operates in conjunction with the cam mechanism to enhance the operational characteristics thereof. Previous attempts at cam hinges for laptops demanded that the cam mechanism, which provides torque in opposition to the frictional torque as the lid nears the closed position, be capable of overwhelming the friction mechanism in order to perform its intended function. This placed a strain on the cam mechanism, resulting in the need for a stronger heavier hinge, and stronger heavier attachment points in the laptop. By controlling the magnitude of the friction by substantially reducing it at the moment of cam engagement, the cam hinge becomes a far more practical device.

25 Claims, 5 Drawing Sheets

US 6,470,532 B2

CAM HINGE WITH CONTROLLED FRICTION FOR IMPROVED CAM OPERATION

This application claims priority to a provisional application Ser. No. 60/185,605 filed Feb. 29, 2000.

BACKGROUND TO THE INVENTION

Our invention relates to friction hinges used to position electronic displays for best viewing, and to cam mechanisms as applied to holding shut a cover or lid without a latch mechanism.

Laptop and portable computers, herein referred to as laptops, have displays built into their lids, which usually are closed while the computers are being moved. The lids of prior art laptops are held shut with latch mechanisms. Extra hand movements are usually required to open latch mechanisms, and extra parts are required in the computer for the mechanisms are required in the computer for the mechanisms themselves. In addition, the latch mechanisms are somewhat prone to breakage. Therefore, it is advantageous to be able to hold laptop lids shut without the requirement for latch mechanisms.

If a laptop that is to be held shut by some mechanism other than a latch, it must remain firmly shut when the laptop is carried. The lid must not open, even slightly, during normal movements of the laptop. On the other hand, when the laptop is being prepared for use, the lid should open as easily as possible, preferably without requiring the use of two hands, one to lift the lid, and the other to hold down the base of the laptop.

There is a further requirement for controlling the position of the lid for a laptop. In use, the lid must remain in position. Laptop lids are positioned by the user. Desirably, this positioning should be done easily without the need for holding down the base while positioning the lid. Furthermore, once positioned for advantageous viewing, the lid should remain in position, without creeping or excessive bouncing. This requires the use of friction hinges for mounting the lid to the base. All present day laptops employ such hinges.

All friction hinges exhibit some amount of spring back. When laptops having such hinges but no latch mechanism are closed, they spring open slightly due to the strain energy stored in the spring element that produces the hinge's friction. Furthermore, the torque holding the lid in position is limited to the torque provided by the friction hinges. This torque is inadequate for keeping the lid firmly closed while carrying the laptop. Therefore, additional closing torque, beyond that provided by the friction hinge is needed to keep the lid tightly closed.

A cam, which engages a spring-loaded follower as the lid is closed, can provide additional closing torque so that the latch can be eliminated. However, the closing torque produced by the cam device must be sufficiently great so as to overcome all of the torque of the friction hinge. That requirement demands that the hinge and its attachment to the lid and base be sufficiently robust.

However, the additive nature of the cam and friction forces requires that the torque to open the lid overcome both the cam-induced lid closing force and the frictional torque. This fact makes it difficult to balance these torques so as to prevent lifting the base while lifting the lid. Thus, two hands are required, one to open the lid and the other to hold down the base. A hinge which eliminates this conflict between the cam and frictional torque is the goal of our invention.

SUMMARY OF THE INVENTION

Our invention consists of a hinge with a cam mechanism to provide the torque needed to hold the lid closed and a band wrapped about a shaft to provide torsional friction to maintain the position of the lid when it is open. The cam mechanism consists of a cam and an engaging member. The engagement and disengagement of the engaging member by the cam results in an increase in closing effort followed by a decrease and finally a snapping closure of the lid. The friction band is so formed and aligned rotationally with features of the shaft that the there is a sudden and steep reduction of the frictional torque at the time of follower engagement so as to permit the cam mechanism to act with maximum effect.

Accordingly, it is an object of the invention to provide an alternative hinge-closing mechanism for a laptop computer.

It is also an object of our invention to provide a lid positioning and closing mechanism that is beneficially usable in other equipment.

It is a further object of our invention to provide the means by which a laptop computer can be opened and their lids positioned with one hand.

It is a still further object of our invention to provide a lid positioning and closing mechanism for laptop computers and other, similar equipment that allows the elimination of the latch mechanism for the lid.

The inventive hinge-closing mechanism accordingly comprises the features of construction, combination of elements, and arrangement of parts which will be exemplified in the constructions described hereinafter, and the scope of the invention will be indicated in the claims.

BRIEF DESCRIPTION OF THE DRAWINGS

For a further understanding of our invention, reference is made to the following detailed description, read in conjunction with the drawings, in which.

DETAILED DESCRIPTION OF THE INVENTION

Figure 1:
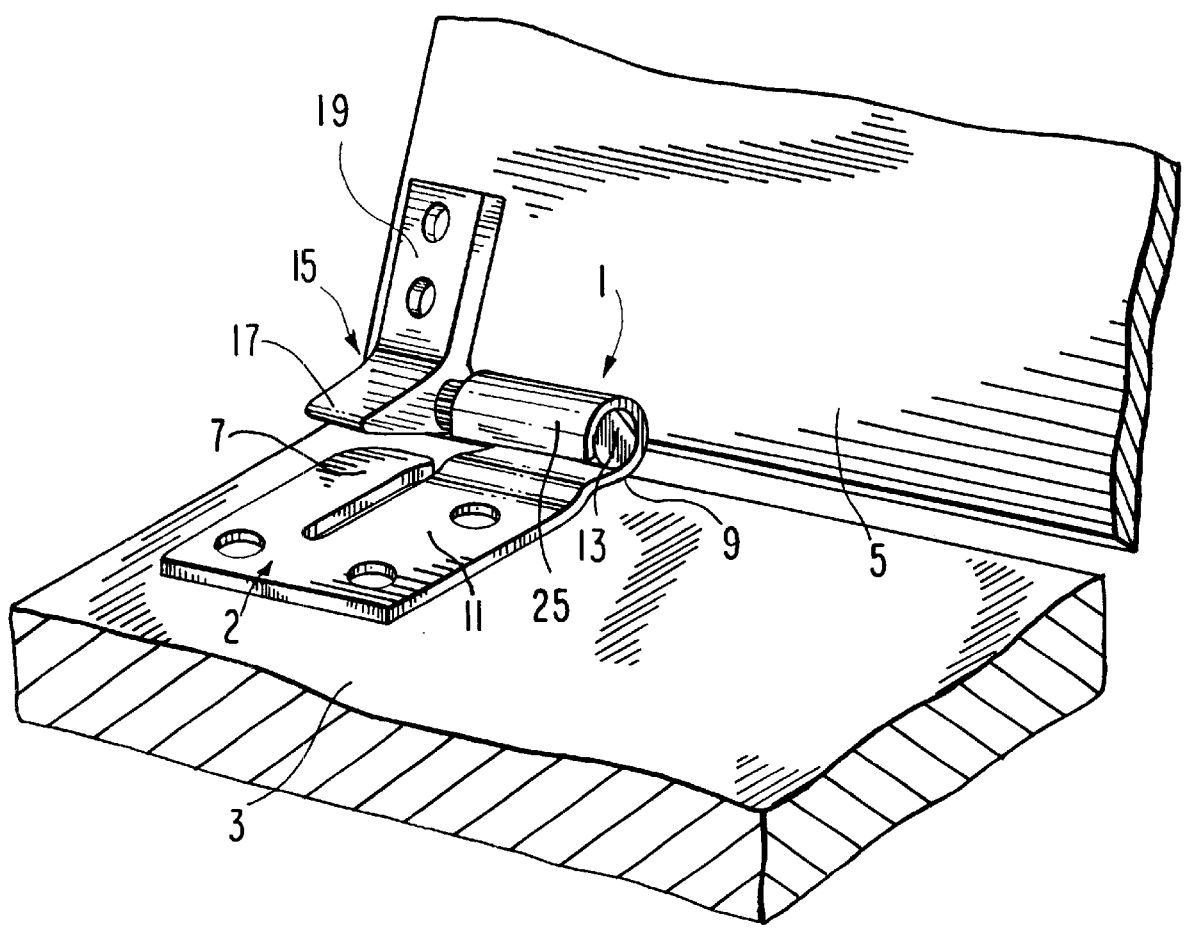
FIG. 1 is a perspective view of one corner of a laptop computer and lid showing the preferred embodiment of the inventive friction hinge and cam mechanism.

Referring now to FIG. 1, the inventive cam hinge 1 with enhanced frictional properties is shown connecting base 3 to lid 5 of a laptop computer or other two part assembly comprised of a base and a lid which is to be pivotally mounted thereto. The band portion 2 of hinge 1 is mounted to base 3, and has a cam portion 7, a cylindrical portion 9, and a mounting flange 11 integrally formed with cam portion 7. Band portion 2 of hinge 1 must be fabricated of a spring material and must be heat treated to produce good spring properties. Mounting flange 11 is shown attached to laptop base 3. One end of hinge pin 13 is inserted into cylindrical portion 9 of band portion 2. The other end of hinge pin 13 is irrotatably connected to lid portion 15 of hinge 1 via opening 14 formed in lid portion 15 (see FIG. 2).

Cylindrical portion 9 of band portion 2 is formed with an inside diameter smaller than the outside diameter of hinge pin 13, producing an interference fit between these two parts. In addition to opening 14 for receiving hinge pin 13, lid portion 15 of hinge 1 consists of cam lobe or cam engaging member 17 and an integrally formed flange 19 for mounting to laptop lid 5.

Figure 2:
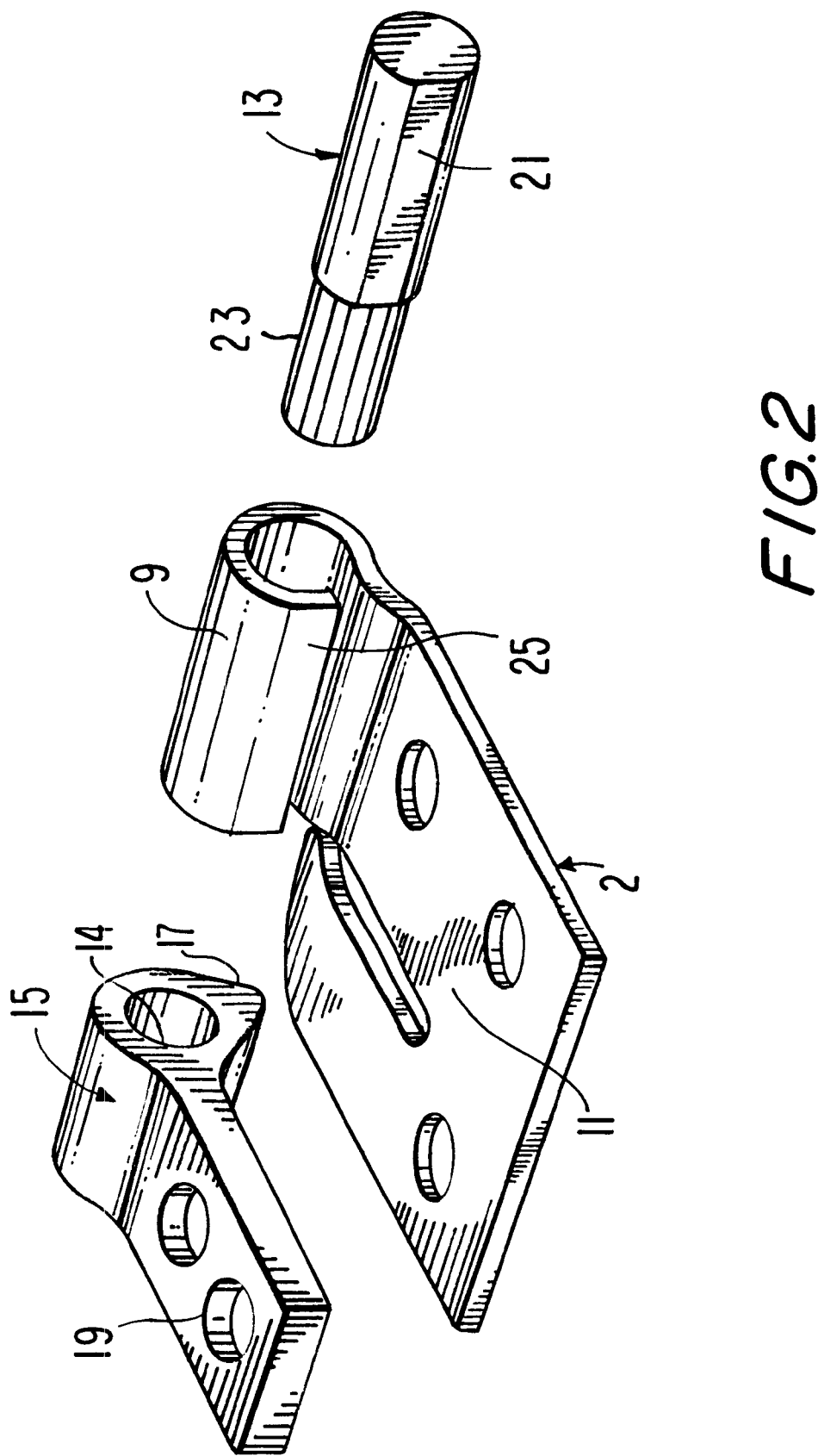
FIG. 2 is an exploded view of the mechanism of FIG. 1, showing the detent friction hinge band, the shaft, and the cam.
Figure 3:
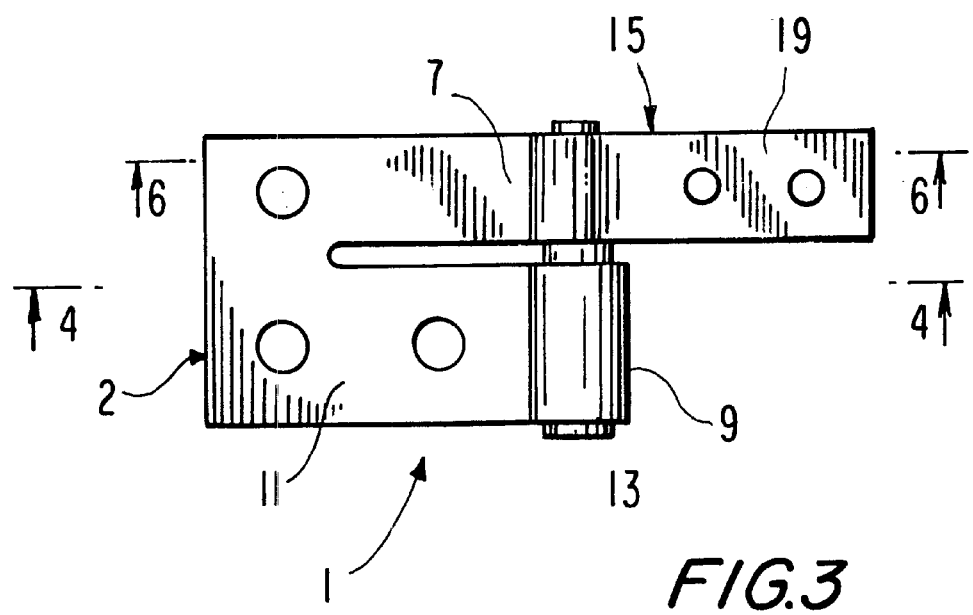
FIG. 3 is a plan view of the inventive friction hinge and cam mechanism with the cam rotated 180 degrees from the position depicted in FIGS. 1 and 2.

FIG. 2 shows the three parts of hinge 1. Hinge pin 13, which must have a hard exterior surface, has a generally cylindrical shape with flat or planar portion 21 extending axially along its length. One end of hinge pin 13 has a knurled portion 23 for easy attachment to lid portion 15 within opening 14. During assembly, hinge pin 13 is pressed through cylindrical portion 9 and into opening 14 of lid portion 15 so that hinge pin 13 rotates with lid portion 15. Because of the interference fit between cylindrical portion 9 of band portion 2 and hinge pin 13, the insertion of pin 13 will cause a slight expansion of cylindrical portion 9.

Cylindrical portion 9, while generally cylindrical in form, has, adjacent its end, an axially running flat or planar portion 25 which forms a chord across the generally circular shape of cylindrical portion 9 of band portion 2. Flat 25 of cylindrical portion 9 is most clearly seen in FIGS. 4 and 5.

Figure 4:
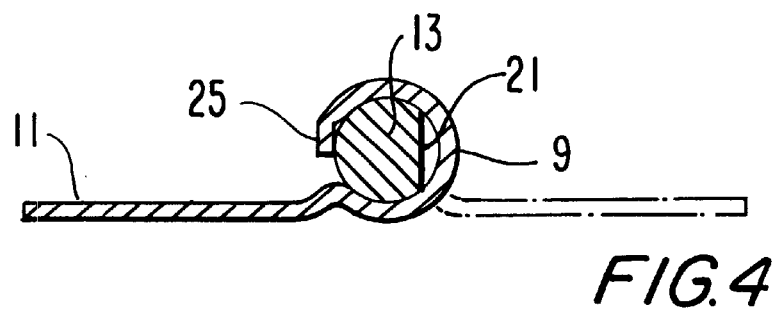
FIG. 4 is a partial cross-sectional view taken along the line A—A in FIG. 3 and shows the positions of the flats on the band and the shaft with the hinge in the open position.
Figure 5:
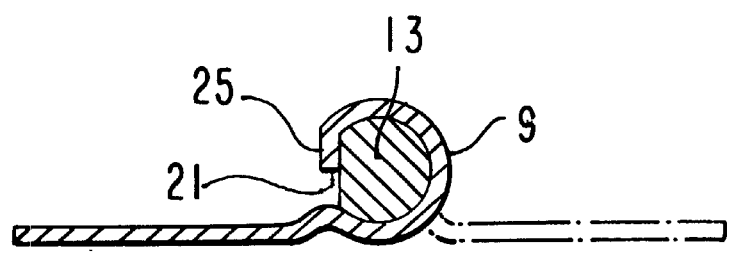
FIG. 5 is a partial cross-sectional view similar to that of FIG. 4, but showing the shaft in a fully closed position.
Figure 6:
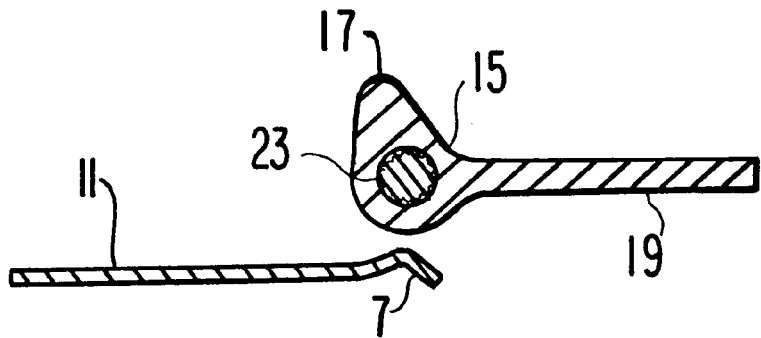
FIG. 6 is a cross-sectional view taken along the line B—B in FIG. 3, and shows the hinge in a fully opened position.
Figure 7:
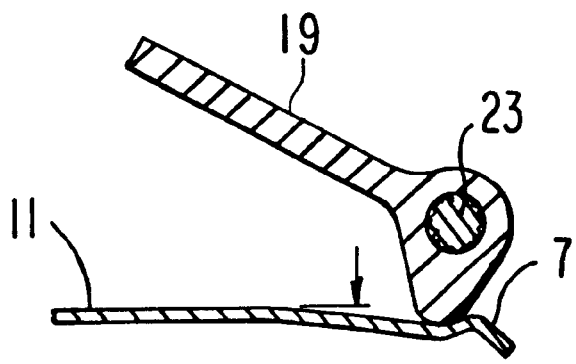
FIG. 7 is a cross-sectional view similar to that of FIG. 6 and showing the hinge in a position to begin contacting the cam as it is being closed.
Figure 8:
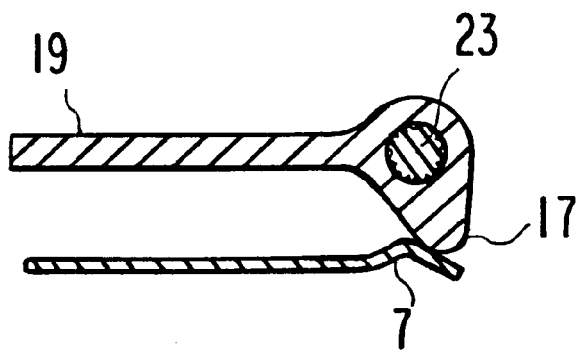
FIG. 8 is a cross-sectional view similar to that of FIG. 6 and showing the hinge in a fully closed position.

Operation of the inventive cam hinge 1 can be understood by examination of FIGS. 4 and 5 together with FIGS. 6, 7 and 8. When lid 5 of the laptop computer has been rotated more than approximately 45 degrees from the closed position, as shown in FIGS. 4 and 6, cam lobe 17 of lid portion 15 no longer contacts cam portion 7 of band portion 2. Hinge pin 13 is rotating within cylindrical portion 9 of band portion 2 such that flat 21 of hinge pin 13 does not contact or face flat portion 25 of band 2, and cam lobe 17 of lid portion therefore makes no contact with cam portion 7 of band portion 2. Throughout this range of operation, hinge 1 is providing the amount of frictional torque which results from the interference fit between cylindrical portion 9 of band portion 2 and hinge pin 13. This frictional torque is well understood by those skilled in the art of friction hinges, and does not require further explanation, except to say that sufficient frictional torque must be provided to enable satisfactory positioning during use of lid 5 with respect to base 3 of the laptop during use.

As lid 5 is closed, cam lobe 17 of lid portion 15 eventually comes into contact with cam portion 7 of band portion 2, as seen in FIG. 7. Further closing motion causes cam lobe 17 to depress cam portion 7, which requires the application of additional closing torque by the user, until cam lobe 17 passes beyond the peak of cam portion 7, as seen in FIG. 8. Thereafter, as in the normal operation of such cams, a torque is produced, tending to further close the lid. As lid 5 is closed, hinge pin 13 is rotated toward the position shown in FIG. 5. This brings flat portion 25 of cylindrical portion 9 into seating alignment with flat 21 of hinge pin 13, and allows cylindrical portion 9 of band portion 2 to assume a smaller size when in this relative angular orientation.

This reduction in the size of cylindrical band portion 2 reduces the contact forces between band portion 2 and pin 13, and therefore reduces the frictional torque required to rotate one within the other.

The reduction of the frictional torque thus achieved is essential in obtaining good closure of the laptop from the combined cam-friction hinge mechanism. When the frictional torque is not eliminated in the closing position, there is always a tendency for the lid to spring open easily, and a much more aggressive cam profile is needed to obtain good closure. A larger and stronger cam mechanism adds undesirable cost, size and weight to the laptop.

Figure 9:
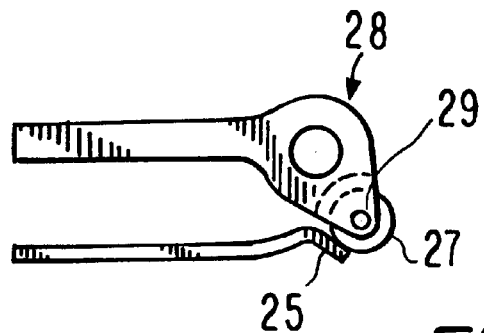
FIG. 9 is a cross-sectional view of an alternate embodiment of the friction hinge of the invention, in which a roller is added to the cam and showing the hinge in a fully closed position.

FIG. 9 shows an alternate embodiment in which a cam roller 27 has been mounted into cam lobe 29 of lid portion 28 to reduce the friction between cam lobe 29 and cam portion 25 of the inventive cam mechanism.

Figure 10:
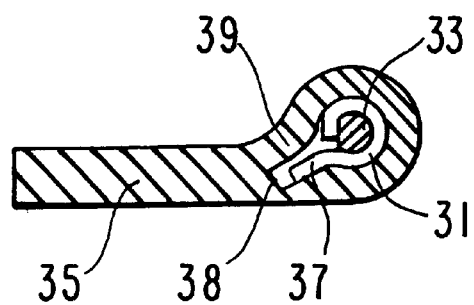
FIG. 10 is a cross-sectional view of yet another embodiment of the invention, in which the friction band of the inventive friction hinge is contained within an enclosure.

FIG. 10 shows an alternate embodiment of our invention in which the band portion has been formed as a separate cylindrical spring 31. As before, spring 31 is approximately co-axially disposed about hinge pin 33. Spring 31 is mounted into an axially enclosed housing 35, which can be mounted to the laptop base. In this embodiment, spring 31 has a tail 37 which fits into slot 38 of housing 35 and is tightly captured therewithin by any of various means that are well know to those skilled in the art of friction hinges.

Figure 11:
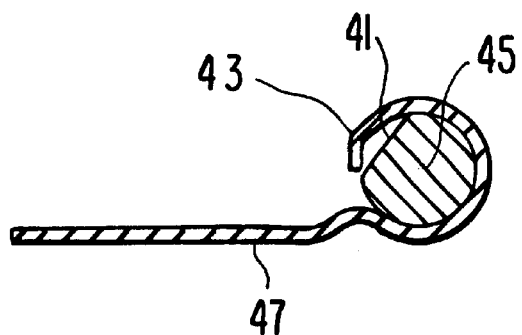
FIG. 11 is a cross-sectional view of a further embodiment of the invention, in which the radius of the shaft of the inventive friction hinge has been reduced along a portion of its circumference in order to lower the torsional frictional torque when the hinge is in a closed position.

FIG. 11 depicts another method for relieving the frictional hinge torque in and near the closed position of a laptop computer. It is a characteristic of torsional friction obtained from a spring band tightly wrapped about a shaft that, for rotation in the direction tending to tighten the band on the shaft, the amount of frictional torque produced depends strongly upon the wrap angle. That is, the extent to which the band wraps about the shaft. In this embodiment of our invention, the effective wrap angle is reduced at closure as flat 41 on hinge pin 45 reaches the end of the wrapped cylindrical portion 43 of band 47. This reduces the torsional friction provided by the hinge, although to a smaller degree than in the preferred embodiment. Also, the positive closing effect that arises from the alignment of the two flats is missing.

Although the embodiments described relate to a closing mechanism for a hinge, it is understood that one of skill in the art could use the inventive mechanism in facilitating the opening of the hinge.

It will thus be seen that the objects set forth above, among those made apparent from the preceding description, are efficiently attained, and since certain changes may be made in the invention described herein without departing from the spirit and scope of the invention, it is intended that all matter contained in the above description shall be interpreted as illustrative and not in a limiting sense.

It is also to be understood that the following claims are intended to cover all of the generic and specific features of the invention described herein, and all statements of the scope of the invention which, as a matter of language, might be said to fall therebetween.

What is claimed is:

1. A friction hinge assembly comprising:

a first member and a second member rotatably connected thereto for enabling said first member to be disposed at varying angular positions relative to said second member;

a shaft fixedly coupled to said first member;

a band fastened to said second member, said band including a spring portion frictionally wrapped about said shaft for providing frictional torque between said shaft and said spring portion;

a cam mechanism comprising a first cam member fastened to said first member and rotatable with said shaft, and a second cam member fastened to said second member, said first cam member being engageable with said second cam member at a selected angular position;

wherein said shaft and said frictionally wrapped spring portion of said band are rotationally aligned such that the frictional torque exerted between said shaft and said spring portion is reduced substantially when said first cam member engages said second cam member.

2. The assembly of claim 1, wherein said first cam member engages said second cam member as said first and second members close together in order to provide a closing torque.

3. The assembly of claim 1, wherein said band is fastened to said second member by means of a mounting flange.

4. The assembly of claim 3, wherein said second cam member is integrally formed with said mounting flange.

5. The assembly of claim 1, wherein said shaft is fixed to said first member by means of a mounting flange.

6. The assembly of claim 5, wherein said first cam member is integrally formed with said mounting flange.

7. The assembly of claim 1, wherein said spring portion of said band is substantially cylindrical in configuration.

8. The assembly of claim 7, wherein said spring portion of said band has an inside diameter and said shaft has an outside diameter, said outside diameter of said shaft being larger than the inside diameter of said spring portion.

9. The assembly of claim 1, wherein said shaft has a knurled end to facilitate coupling to said first member.

10. The assembly of claim 1, wherein said shaft is formed with an axially at least partially extending planar portion and said spring portion of said band is formed with a corresponding axially extending flat portion.

11. The assembly of claim 10, wherein said planar portion of said shaft is in seating alignment with said flat portion of said spring portion of said band substantially when said first cam member engages said second cam member in order to substantially reduce the frictional torque exerted between said band and said shaft.

12. The assembly of claim 1, wherein said first cam member and said second cam member engage in order to provide an opening torque.

13. A friction hinge comprising:

a rotatable shaft and a band including a spring portion frictionally wrapped about said shaft for providing frictional torque between said shaft and said spring portion;

a cam mechanism comprising a first cam member rotatable with said shaft and a second cam member with which said first cam member is engageable at a selected rotational position of said shaft;

wherein said shaft and said frictionally wrapped spring portion of said band are rotationally aligned such that the frictional torque exerted between said shaft and said spring portion is substantially reduced when said first cam member engages said second cam member.

14. The hinge of claim 13, wherein said shaft is fixedly coupled to said first cam member.

15. The hinge of claim 14, wherein said shaft includes a knurled end for engagement into an opening formed in said first cam member.

16. The hinge of claim 13, wherein said band includes said second cam member.

17. The hinge of claim 13, wherein said spring portion of said band is substantially cylindrical in configuration.

18. The hinge of claim 17, wherein said spring portion of said band has an inside diameter and said shaft has an outside diameter, said outside diameter of said shaft being larger than the inside diameter of said spring portion.

19. The hinge of claim 13, wherein said shaft is formed with an axially at least partially extending planar portion and said spring portion of said band is formed with a corresponding axially extending flat portion.

20. The hinge of claim 19, wherein said planar portion of said shaft is in seating alignment with said flat portion of said spring portion of said band substantially when said first cam member engages said second cam member in order to substantially reduce the frictional torque exerted between said band and said shaft.

21. The hinge of claim 13, wherein one of said first and second cam members includes a roller for reducing friction therebetween.

22. The hinge of claim 13, wherein said spring portion of said band is mounted in a housing.

23. The hinge of claim 22, wherein said spring portion includes a tail and said housing is formed with a slot for receiving said tail.

24. The hinge of claim 13, wherein said first cam member engages said second cam member as said first and second members close together in order to provide a closing torque.

25. The hinge of claim 13, wherein said cam members engage as said first and second members open in order to provide an opening torque.

* * * * *